United States Patent
Kast et al.

(10) Patent No.: US 9,738,145 B2
(45) Date of Patent: Aug. 22, 2017

(54) METHOD FOR FORMING A SEAL OR COVER ON AN OPENING OF A VEHICLE BODY

(71) Applicant: CQLT SaarGummi Technologies S.à.r.l., Remich (LU)

(72) Inventors: Christian Kast, Merzig-Brotdorf (DE); Frank Michaely, Wadern-Neukirchen (DE); Klaus Morawski, Saarbruecken (DE)

(73) Assignee: CQLT SaarGummi Technologies S.à.r.l., Remich (LU)

( * ) Notice: Subject to any disclaimer, the term of this patent is extended or adjusted under 35 U.S.C. 154(b) by 130 days.

(21) Appl. No.: 14/380,495

(22) PCT Filed: May 6, 2013

(86) PCT No.: PCT/EP2013/001329
§ 371 (c)(1),
(2) Date: Aug. 22, 2014

(87) PCT Pub. No.: WO2013/167257
PCT Pub. Date: Nov. 14, 2013

(65) Prior Publication Data
US 2015/0034228 A1 Feb. 5, 2015

(30) Foreign Application Priority Data

May 8, 2012 (DE) ........................ 10 2012 104 024

(51) Int. Cl.
*B29C 65/52* (2006.01)
*B60J 10/00* (2016.01)
(Continued)

(52) U.S. Cl.
CPC ......... *B60J 10/0077* (2013.01); *B29C 65/524* (2013.01); *B29C 66/112* (2013.01);
(Continued)

(58) Field of Classification Search
CPC . B29C 65/524; B29C 66/112; B29C 66/1122; B29C 66/345; B29C 66/346;
(Continued)

(56) References Cited

U.S. PATENT DOCUMENTS 4,477,304 A 10/1984 Westermann
7,208,057 B2 4/2007 Weisser
(Continued)

FOREIGN PATENT DOCUMENTS

CN 101067471 A 11/2007
CN 101970255 A 2/2011
(Continued)

OTHER PUBLICATIONS

English version of Robatech AG: "Auftragssteuerungen AS zu Klebstoff-Systemen", Muri [CH], Apr. 17, 2008, XP002707707, Retrieved from the Internet: URL: http://www.robatech.de/doc/Brochure_Pa tterncontrolAS_de.pdf [retrieved on Jul. 30, 2013].
(Continued)

*Primary Examiner* — George Koch
(74) *Attorney, Agent, or Firm* — Collard & Roe, P.C.

(57) ABSTRACT

A method for forming a seal or cover on an opening of a vehicle body. An extruded strand made of an elastomer material is adhered to a body support surface which receives the strand, and the support surface and/or a strand surface to be adhered is supplied with adhesive material prior to the adhesion process. The supply of adhesive material is controlled according to an adhesive material quantity requirement based on the strand length, the requirement changing in the longitudinal direction of the support surface, as a result of depressions and/or steps for example, and/or according to an arrangement of the strand surface to be adhered on the strand, the arrangement changing in the longitudinal direction of the support surface.

10 Claims, 1 Drawing Sheet

Figure 1:
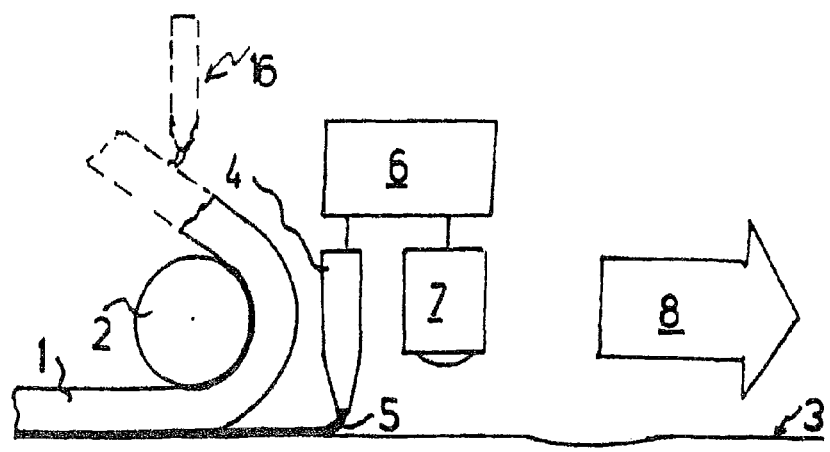

(51) Int. Cl.

| | | |
|---|---|---|
| *B29C 65/00* | (2006.01) | |
| *B32B 37/12* | (2006.01) | |
| *B60J 10/84* | (2016.01) | |
| *B60J 10/34* | (2016.01) | |
| *B60J 10/80* | (2016.01) | |
| *B29L 31/30* | (2006.01) | |

(52) U.S. Cl.
CPC .......... *B29C 66/345* (2013.01); *B29C 66/346* (2013.01); *B29C 66/472* (2013.01); *B29C 66/5326* (2013.01); *B29C 66/71* (2013.01); *B29C 66/8362* (2013.01); *B29C 66/95* (2013.01); *B29C 66/954* (2013.01); *B29C 66/9672* (2013.01); *B32B 37/1284* (2013.01); *B60J 10/345* (2016.02); *B60J 10/45* (2016.02); *B60J 10/80* (2016.02); *B60J 10/84* (2016.02); *B29C 66/1122* (2013.01); *B29L 2031/302* (2013.01); *Y10T 156/10* (2015.01)

(58) Field of Classification Search
CPC ... B29C 66/472; B29C 66/5326; B29C 66/71; B29C 66/8362; B29C 66/95; B29C 66/954; B29C 66/9672; B29L 2031/302; B32B 37/1284; B32B 2309/105; Y10T 156/10
USPC .......................................................... 156/64
See application file for complete search history.

(56) References Cited

U.S. PATENT DOCUMENTS

| | | |
|---|---|---|
| 8,839,589 B2 | 9/2014 | Erner |
| 2004/0236454 A1* | 11/2004 | Weisser ................ B29C 65/52 700/123 |
| 2006/0201622 A1 | 9/2006 | Sehr et al. |
| 2012/0043009 A1 | 2/2012 | Niermann et al. |

FOREIGN PATENT DOCUMENTS

| | | |
|---|---|---|
| DE | 91 01 070 U1 | 4/1991 |
| DE | 100 25 369 A1 | 12/2001 |
| DE | 103 19 926 A1 | 11/2004 |
| DE | 10 2010 043 201 A1 | 5/2012 |
| EP | 0 627 341 A1 | 12/1994 |
| JP | 2004-26089 A | 1/2004 |
| WO | 02/076778 A1 | 10/2002 |
| WO | 2010/106123 A1 | 9/2010 |

OTHER PUBLICATIONS

Chinese Office Action in CN 201380013094.X, dated Nov. 23, 2015.
International Search Report of PCT/EP2013/001329, mailed Aug. 12, 2013.
German Search Report in 10 2012 104 024.9, dated Feb. 18, 2013, with English translation of relevant parts.

* cited by examiner

METHOD FOR FORMING A SEAL OR COVER ON AN OPENING OF A VEHICLE BODY

CROSS REFERENCE TO RELATED APPLICATIONS

This application is the National Stage of PCT/EP2013/001329 filed on May 6, 2013, which claims priority under 35 U.S.C. §119 of German Application No. 10 2012 104 024.9 filed on May 8, 2012, the disclosure of which is incorporated by reference. The international application under PCT article 21(2) was not published in English.

The invention relates to a method for forming a seal or cover on an opening of a vehicle body, in which an extruded strand composed of an elastomer material is glued onto a support surface of the body that accommodates the strand, and adhesive material is supplied to the support surface or/and to a surface of the strand to be glued, before gluing takes place.

The production of seals on vehicle bodies by means of gluing elastomer strands to a support surface of the body is known, for example, from WO 02/076 778 A1. Adhesive material is applied to the support surface, using an application device, while the strand is supplied as an endless strand, for gluing the elastomer material strand on. At a constant material flow of the supply, the adhesive connection between the elastomer material strand and the support surface can be impaired.

The invention is based on the task of creating a new method of the type mentioned initially, in which greater security of the connection between strand and support surface can be achieved.

The method according to the invention that accomplishes this task is characterized in that the amount of adhesive material supplied is controlled in accordance with a demand for the amount of adhesive material that changes in the longitudinal direction of the support surface and is related to the strand length, or/and in accordance with an arrangement of the surface of the strand to be glued on the strand, which arrangement changes in the longitudinal direction of the support surface.

The invention is based on the recognition that at a constant supply of adhesive material, a secure connection between elastomer material strand and support surface cannot be achieved, if variations in the amount of adhesive material supplied are necessary in the longitudinal or/and transverse direction of the support surface. In particular, the amount of adhesive material required can change as the result of depressions, elevations or/and steps in the support surface. Depressions occur, in particular, at point-weld connections between layers of sheet metal. Steps occur, for example, where layers of sheet metal of the car body overlap; elevations occur, for example, at rivet connections. Variations in the supply, including the amount of adhesive material supplied, can also become necessary because the position and width of the adhesive surface on the strand change, for example in certain sections, in its longitudinal direction.

Preferably, paste-like adhesive material, suitable for filling out cavities under the strand, because of a certain shape retention, is supplied.

It is practical if the strand is continuously glued to the support surface in its longitudinal direction, and particularly rolled onto the support surface, wherein the strand is preferably supplied as an endless strand.

The viscosity of the adhesive material and the press-down force of a device that applies the strand can be coordinated with one another in such a manner that the adhesive material is optimally distributed under the strand, between strand and support surface.

The supply of adhesive material preferably takes place using a supply device that moves along with the continuous gluing region of the strand, if applicable synchronously. Alternatively, a device that is fixed in place and supplies adhesive material only to the strand, for example, can be provided.

Control of the amount supplied can advantageously be controlled using signals of a sensor that optically detects the support surface. Alternatively or additionally, control using a relationship between the demand for the amount to be supplied and the path position along the support surface, stored in memory, would also be possible.

While, as has already been mentioned, distribution of the adhesive material under the strand could occur on its own, by pressing the strand against the support surface, corresponding spreading of the adhesive material supplied on the support surface or/and the strand could also be carried out before application of the strand to the support surface.

Cavities (flood grooves) for the accommodation of excess adhesive material, which are open toward the support surface, can be formed in the strand.

The support surface is preferably a surface that runs circumferentially around the edge of a vehicle door, a vehicle door opening, or another body opening or hatch, which surface accommodates a seal strand for forming a door or body seal.

Figure 2:
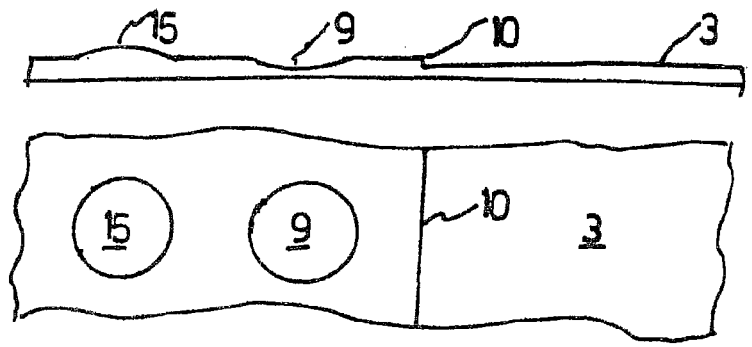
Figure 3:
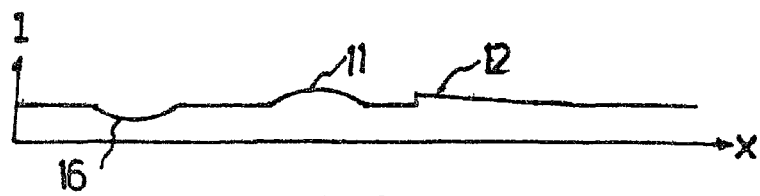
Figure 4:
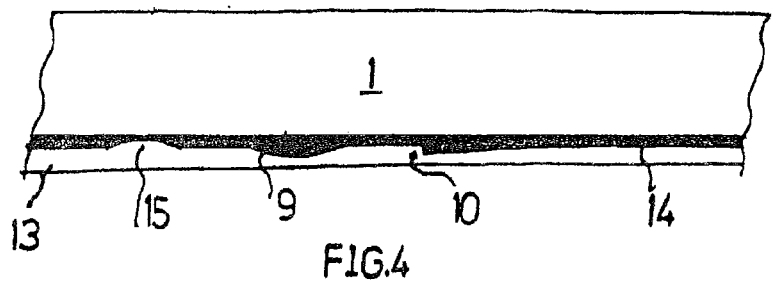

The invention will be explained in greater detail below, using an exemplary embodiment and the drawings that are attached and relate to this exemplary embodiment. The drawings show:

FIG. 1 a representation that explains the principle of the gluing method according to the invention, FIG. 2 a support surface for accommodating a seal strand with an elevation formed in the support surface, a depression, and a step formed in the support surface, FIG. 3 a representation that explains the supply of adhesive material in the method according to the invention, FIG. 4 a seal strand connected with a sheet-metal body part according to the method according to the invention.

FIG. 1 schematically shows an extruded seal strand 1, which is applied to a support surface 3 of a vehicle body using a roller application device comprising a roller 2, which device is not shown in any further detail. The support surface can be, for example, a surface that runs around the edge of a vehicle door or vehicle door opening, and accommodates a seal strand for forming a door seal. Alternatively to the roller 2, a slide shoe would also be possible.

A device 4 for supplying paste-like adhesive material 5 is connected with a device 6 that controls the amount of adhesive material supplied. The control device 6 is furthermore connected with a sensor 7, which detects the support surface 3 in contact-free manner, if possible, optically, if applicable. The supply device 4 and the sensor 7 move, preferably synchronously, with the roller 2 of the roller application device, in the direction of the arrow 8. The supply device 4 and/or the sensor 7 can be structurally connected with the roller application device. As is indicated with broken lines, the supply device could also be disposed fixed in place, for example at 16, and be provided for application of adhesive material to the strand 1. In deviation from the example shown, the application of adhesive could take place at a greater distance in terms of time and space before gluing, so that the applied adhesive can evaporate in the meantime.

As FIG. 2 shows as an example, depressions 9, elevations 15 or/and steps 10 can be situated in the support surface 3 of the vehicle body that accommodates the seal strand 1. Depressions 9 form, for example, at point-weld locations, at which multiple layers of sheet metal are connected with one another; elevations form, for example, at weld connections. Steps 10 occur, for example, at the overlaps of two layers of sheet metal. Cavities under the seal strand, formed as the result of the said depressions, elevations or/and steps, impair its gluing to the support surface 3.

To avoid such impairments, the amount of adhesive material 5 supplied and conveyed by the supply device 4 is controlled, using the device 6, in such a manner that neither undesirably great curvature of the seal strand 1 nor the formation of cavities under the seal strand occurs in the region of elevations 15, depressions 9 or/and steps 10. In the regions in question, the amount of adhesive material 5 supplied is temporarily changed to such an extent that excess adhesive material under the seal strand is avoided at an elevation, with the progression of the seal strand 1 being hardly influenced at all, and that cavities formed under the seal strand 1 at a depression or a step are filled, completely if possible, with the adhesive material 5. The viscosity of the paste-like adhesive material 5 and the press-down pressure of the roller 2 of the roller application device are coordinated with one another in such a manner that uneven areas are evened out to the greatest possible extent.

FIG. 3 shows the material flow I of the adhesive material plotted over the path position x along the support surface 3. As can be seen, the material flow I increases in the region of the depression 9, likewise in the region of the step 10. The sensor 7 that precedes the roller application device and is preferably moved synchronously with it detects the support surface 3, preferably in contact-free manner, and transmits control signals to the control device 6. The control device 6 controls the supply from the supply device 4 in such a manner that the curve progressions 16, 11, and 12 shown in FIG. 3 occur in the region of the depression 9 and of the step 10.

FIG. 4 shows the seal strand 1 glued to the body sheet metal 13. A connection layer 14 between seal strand and body sheet metal formed by the adhesive material 5 has a constant thickness aside from the elevation region and depression region or step region, according to the curve in FIG. 3. In the regions in question, the connection layer 14 is thinned or thickened in accordance with the reduced or increased material supply, and the formation of adhesive material excesses or cavities that impair the connection is avoided. The seal strand 1 has no noteworthy curvature brought about by the elevation 15, the depression 9 or the step 10.

The invention claimed is:

1. Method for forming a seal or cover on an opening of a vehicle body, in which an extruded strand composed of an elastomer material is glued onto a support surface of the body that accommodates the strand, and adhesive material is automatically supplied to the support surface and/or to a surface of the strand to be glued, before gluing takes place, wherein
   the automatic supply of adhesive material is controlled in accordance with a demand for the amount of adhesive material per length of the strand that changes in the longitudinal direction of the support surface as a result of irregularities in the support surface such that the adhesive material only additionally acts as a filler material for smoothing out the irregularities and/or
   the automatic supply of adhesive material is controlled in accordance with an arrangement of said surface of the strand to be glued on the strand, and
wherein
   the control of the supply amount takes place using a sensor that detects the support surface and/or
   the control uses a predetermined relationship between the demand for the amount per length to be applied and the path position along the support surface, the predetermined relationship being stored in a memory.

2. Method according to claim 1, wherein the demand for the amount of adhesive material to be supplied changes as the result of a depression, an elevation or/and a step in the support surface.

3. Method according to claim 1, wherein paste-like adhesive material, suitable for evening out cavities under the strand, is supplied.

4. Method according to claim 1, wherein the strand, particularly supplied as an endless strand, is continuously glued to the support surface and particularly rolled onto the support surface, in its longitudinal direction.

5. Method according to claim 4, wherein the supply of adhesive material takes place using a supply device that is moved accordingly, during continuous gluing of the strand, or using a supply device that works independently of the gluing process.

6. Method according to claim 1, wherein the control of the supply amount takes place using signals of a sensor that detects the support surface, preferably in contact-free manner.

7. Method according to claim 1, wherein a change in the supply amount is selected in accordance with the volume of a cavity to be filled and/or of a press-down pressure exerted by the application device onto the strand.

8. Method according to claim 1, wherein cavities for the accommodation of excess adhesive material, which are open toward the support surface, are formed in the strand.

9. Method according to claim 1, wherein spreading of the adhesive material supplied on the support surface and/or the strand takes place before application of the strand to the support surface.

10. Method according to claim 1, wherein the support surface runs circumferentially around the edge of a vehicle door, door opening, or other body hatches or openings.

* * * * *